United States Patent
Chen et al.

[11] Patent Number: 6,076,869
[45] Date of Patent: Jun. 20, 2000

[54] PRESSING AND LATCHING STRUCTURE FOR A NOTEBOOK-TYPE COMPUTER SCREEN

[75] Inventors: Ying-Hu Chen; Po-An Lin, both of Taipei, Taiwan

[73] Assignee: Compal Electronics, Inc., Taipei, Taiwan

[21] Appl. No.: 09/188,253

[22] Filed: Nov. 10, 1998

[51] Int. Cl.[7] .................................................. E05C 3/04
[52] U.S. Cl. ........................ 292/202; 292/87; 292/128; 292/228; 292/DIG. 61; 361/683
[58] Field of Search ............................... 292/202, 80, 87, 292/81, 128, 102, 103, 228, 198, 203, 303, DIG. 38, DIG. 61; 361/683, 686

[56] References Cited

U.S. PATENT DOCUMENTS

| | | | |
|---|---|---|---|
| 677,653 | 7/1901 | Fuller | 292/228 |
| 4,344,646 | 8/1982 | Michel | 292/87 |
| 4,363,403 | 12/1982 | Raucci, Jr. et al. | 292/128 |
| 4,478,005 | 10/1984 | Mundschenk | 292/87 |
| 4,774,973 | 10/1988 | Gueret | 220/326 |
| 4,901,882 | 2/1990 | Goncalves | 220/324 |
| 5,044,810 | 9/1991 | Matsuoka et al. | 292/128 |
| 5,253,142 | 10/1993 | Weng | 361/680 |
| 5,580,107 | 12/1996 | Howell | 292/95 |
| 5,700,042 | 12/1997 | Weadon et al. | 292/80 |
| 5,785,398 | 7/1998 | Park | 292/128 |

FOREIGN PATENT DOCUMENTS 4120551  1/1992  Germany ................... 292/228

Primary Examiner—B. Dayoan
Assistant Examiner—Clifford B Vaterlaus
Attorney, Agent, or Firm—Bacon & Thomas. PLLC

[57] ABSTRACT

A pressing and latching structure for a notebook-type computer screen, includes a pressing section disposed on the computer screen and a latching section disposed on a main body of the computer. By pressing the pressing section with one hand, the computer screen is unlatched from the main body, permitting the computer screen to be easily pivoted up from the main body.

6 Claims, 4 Drawing Sheets

PRESSING AND LATCHING STRUCTURE FOR A NOTEBOOK-TYPE COMPUTER SCREEN

BACKGROUND OF THE INVENTION

The present invention relates to a pressing and latching structure for a notebook-type computer screen, which enables a user to easily close or pivot up the computer screen from the computer main body. Also, the pressing and latching structure is composed of simplified components.

Conventionally, the screen of a notebook-type computer is latched with the computer main body in such a manner that the left and right sides of the screen are respectively disposed with two pushable engaging hooks. The computer main body is disposed with a latching section. Via a spring, the engaging hook is connected with the inner casing of the computer screen, whereby the spring provides a resilient latching force for the engaging hook to latch with the computer screen. According to such arrangement, for unlatching the computer screen, a user must overcome the resilient force of the spring with both hands so as to disengage the left and right engaging hooks from the latching section of the computer main body. Therefore, it is inconvenient for a user to close or pivot up the computer screen.

SUMMARY OF THE INVENTION

It is a primary object of the present invention to provide a pressing and latching structure for a notebook-type computer screen, which enables a user to more easily close or unlatch and pivot up the computer screen from the computer main body.

The present invention can be best understood through the following description and accompanying drawings, wherein:

DESCRIPTION OF THE PREFERRED EMBODIMENT

Figure 1:
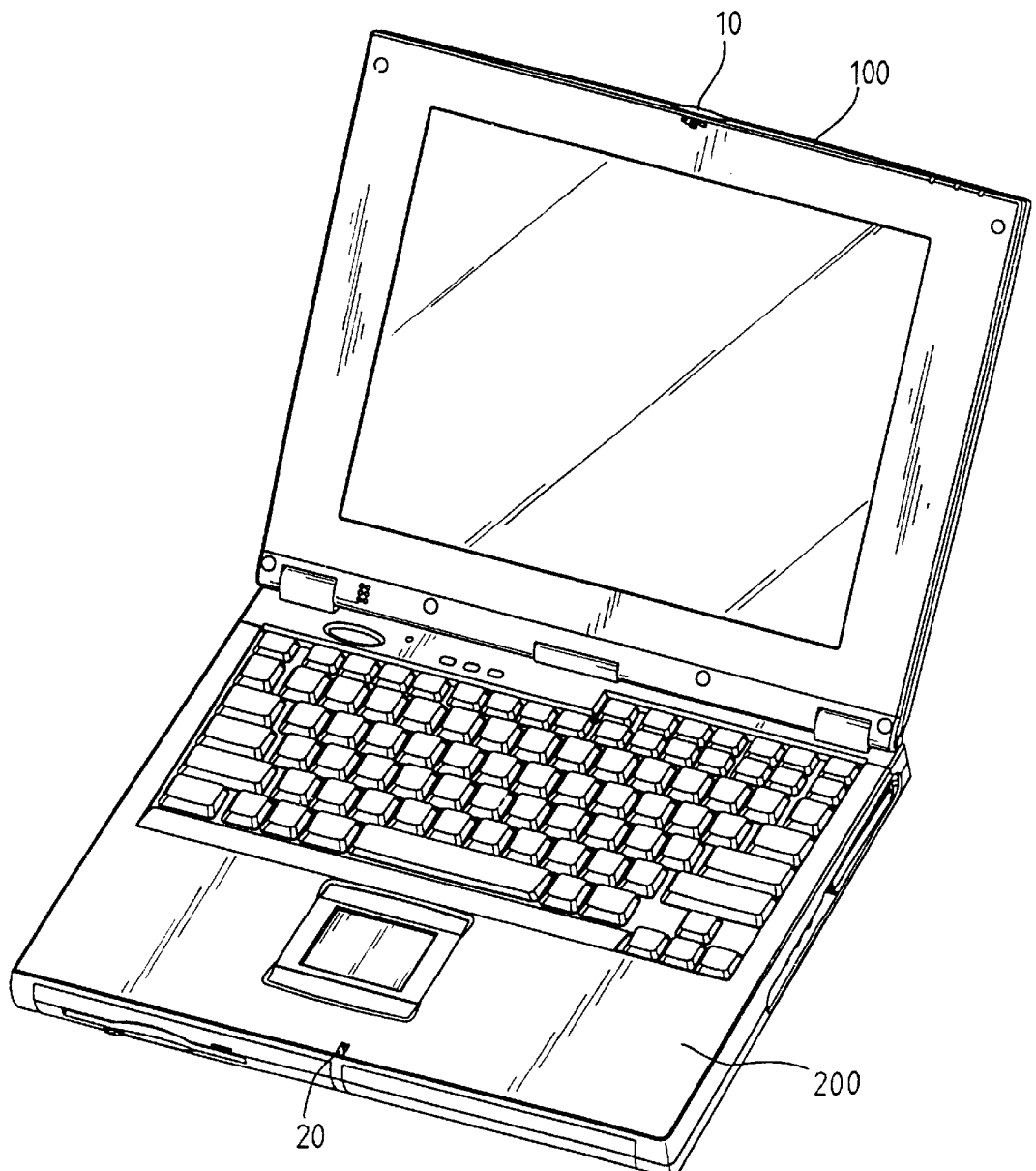
FIG. 1 is a perspective view of the present invention.

Please refer to FIG. 1. The present invention includes a pressing section 10 and a latching section 20.

Figure 2:
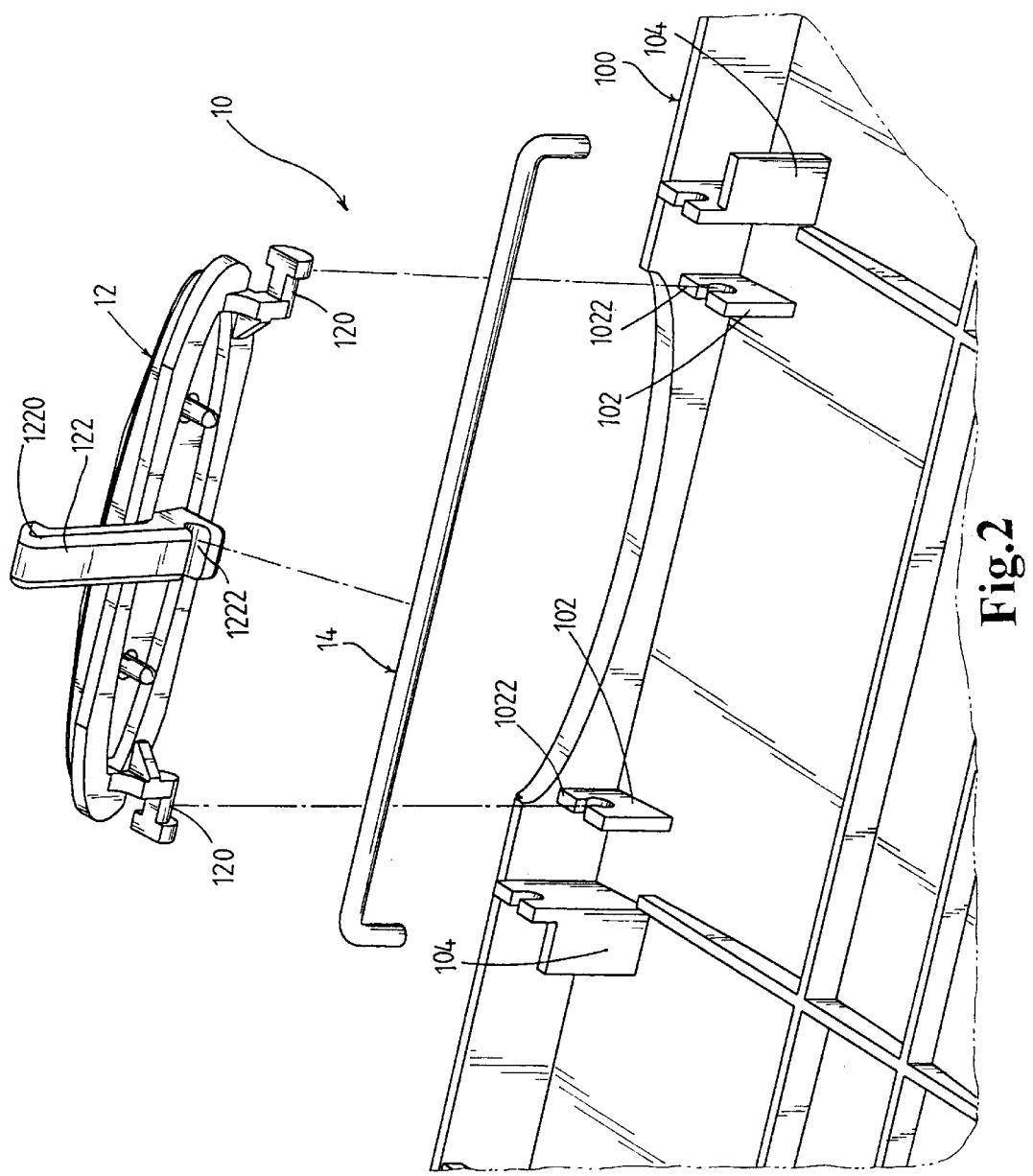
FIG. 2 is a perspective disassembled view of the pressing section of the present invention.

Referring to FIG. 2, the pressing section 10 includes a pressing member 12 and a resilient member 14. The pressing member 12 is pivotally connected with a first pivot section 102 in a housing 100 of the notebook-type computer screen. The resilient member 14 is pivotally connected with a second pivot section 104 of the housing 100. The pressing member 12 is a casing each side of which is disposed with a pivot shaft 120. A middle section of the casing is disposed with a latching bar 122. A front end of the latching bar 122 is formed with a projection 1220. The other end of the latching bar 122 is formed with an insertion groove 1222.

Figure 3:
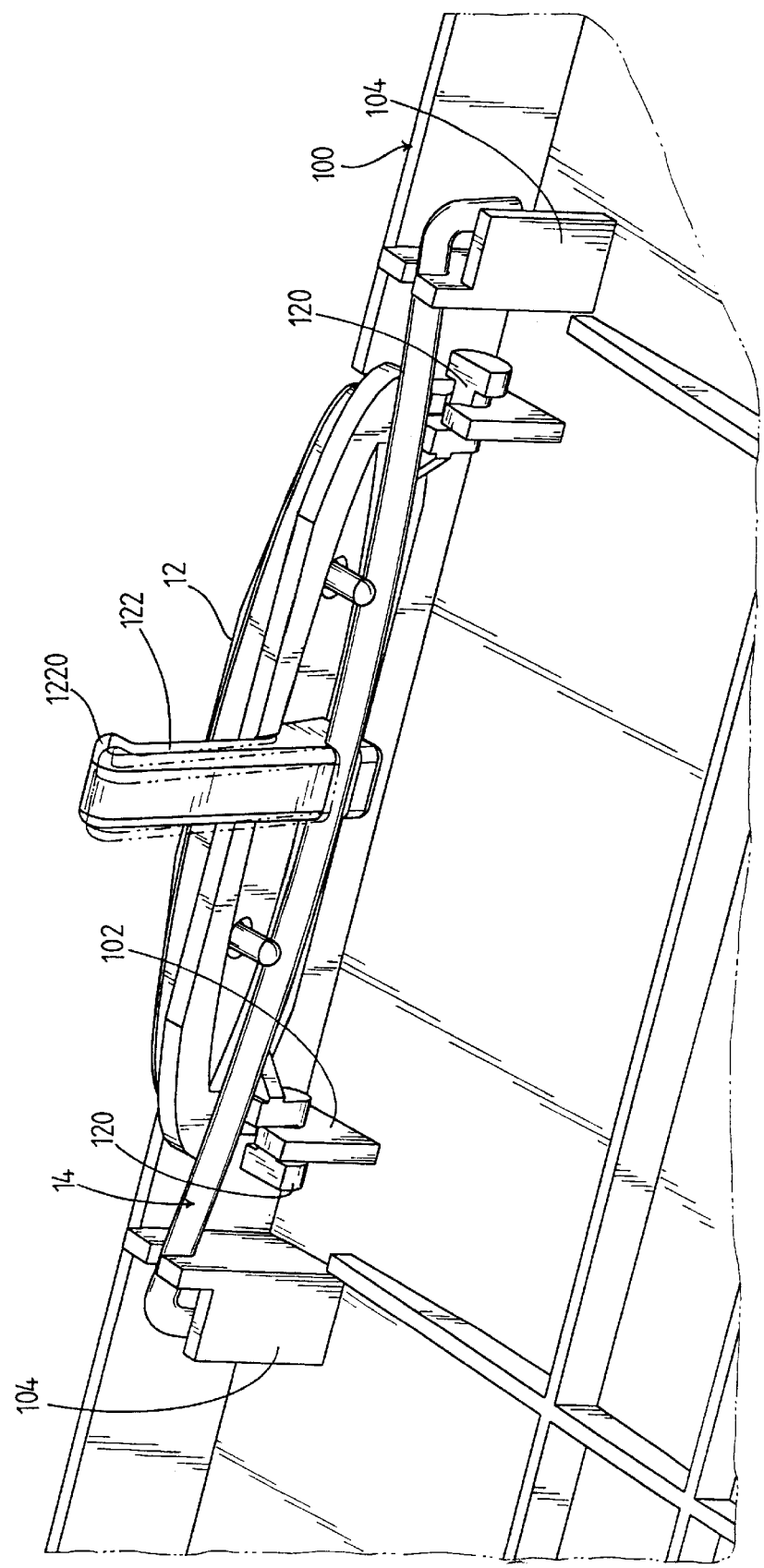
FIG. 3 is a perspective assembled view of the pressing section of the present invention.

Referring to FIG. 3, when assembled, the pressing member 12 is pivotally connected with the first pivot section 102 and the resilient member 14 is pivotally connected with the second pivot section 104 with resilient member 14 latched in the insertion groove 1222 of the latching bar 122.

Figure 4:
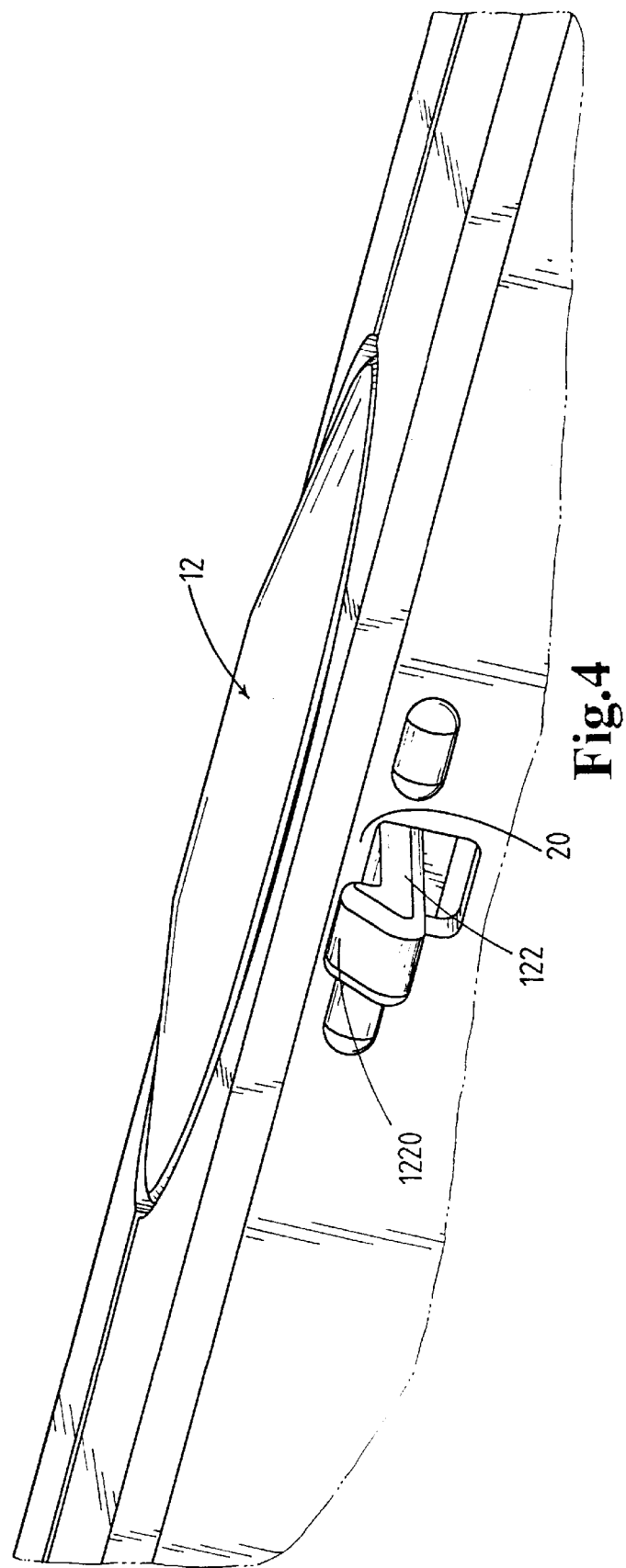
FIG. 4 shows the present invention in a latched state.

Referring to FIGS. 1 and 4, the latching section 20 is a recess structure formed on the main body 200 of the notebook-type computer. The latching section 20 corresponds to the latching bar 122 of the pressing member 12. When the computer screen is closed to overlie the computer main body 200, the latching bar 122 is inserted into the latching section 20. At this time, the projection 1220 is subject to the resilient force of the resilient member 14 and latched with the recess structure of the latching section 20.

When it is desired to pivot up the computer screen from the computer main body 200, the pressing member 12 of the pressing section 10 is slightly pressed. As shown in FIG. 3, at this time, the latching bar 122 and the resilient member 14 suffer a force and are displaced and the pressing section 10 is disengaged from the latching section 20. Therefore, the computer screen can be opened from the computer main body 200. The resilient member 14 and the latching bar 122 are then resiliently restored to their home position. Accordingly, the present invention has simple structure and can be operated with one hand by slightly pressing the pressing member.

Please further refer to FIG. 2. One side of the first pivot section 102 is disposed with a stopper block 1022. When the pressing member 12 is pivotally connected with the first pivot section 102, the stopper block 1022 abuts against one end 1224 of the casing of the pressing member 12 limiting the angle through which the pressing member is pivoted by the resilient member 14. Under such circumstance the rest angle of the pressing member 12 relative to housing 100 of the computer screen, before the pressing member is pressed, can be predetermined; to more stably use the pressing section 10 by determining how far the pressing member 12 needs to be pressed in order to disengage the latching bar 122 from the latching section 20 and permit the computer screen to be opened.

It should be noted that the above description and accompanying drawings are only used to illustrate one embodiment of the present invention, not intended to limit the scope thereof. Any modification of the embodiment should fall within the scope of the present invention.

What is claimed is:

1. A notebook computer including a main body, a computer screen pivotably connected to the main body, and a pressing and latching structure for releasably latching the computer screen into a closed position relative to the main body of the notebook-type computer, said pressing and latching structure comprising:

a pressing section including a pressing member and a resilient member, the pressing member including a casing opposite sides of which are disposed with a pivot shaft for pivotally connecting the pressing member with a first pivot section in a housing of the computer screen, a middle section of the pressing member being disposed with a latching bar, a front of a distal end of the latching bar being formed with a projection, opposite ends of the resilient member being pivotally connected with a second pivot section in the housing of the computer screen and a middle section of the resilient member being received in a recess at a rear side of the latching bar; and a latching section formed in the main body of the notebook-type computer, the latching section serving to receive the latching bar and engage the projection of the latching bar, when the computer screen is closed to overlie the main body, the latching bar of the pressing section is inserted into the latching section to cause the projection of the latching bar to engage the latching section, and when it is desired to pivot up the computer screen from the computer main body, the pressing member of the pressing section is slightly pressed to cause said distal end of the latching bar to pivot in a rearward direction away from said latching section, thereby disengaging the projection of the latching bar from the latching section, permitting the computer screen to be opened from the main body.

2. A pressing and latching structure as claimed in claim 1, wherein the first pivot section includes a pair of supports for receiving said pivot shaft.

3. A pressing and latching structure as claimed in claim 1, wherein the second pivot section includes a pair of supports for receiving said opposite ends of said resilient member.

4. A pressing and latching structure as claimed in claim 1, wherein the latching bar of the pressing member includes the latching recess arranged to receive the resilient member pivotally connected with the second pivot section to latch the resilient member to the latching bar.

5. A pressing and latching structure as claimed in claim 1, wherein said pressing member is pivoted by said resilient member to a rest position relative to the housing of the computer screen, and wherein one side of the first pivot section is disposed with a stopper block, said stopper block being arranged to engage an end of said pressing member and limit said pivoting of the pressing member in order to predetermine said rest position, and thereby determine how far the pressing member needs to be pressed in order to disengage said latching bar from the latching section and open the computer screen from the main body.

6. A pressing and latching structure as claimed in claim 2, wherein said pressing member is pivoted by said resilient member to a rest position relative to the housing of the computer screen, and wherein one side of the first pivot section is disposed with a stopper block, said stopper block being arranged to engage an end of said pressing member and limit said pivoting of the pressing member in order to predetermine said rest position, and thereby determine how far the pressing member needs to be pressed in order to disengage said latching bar from the latching section and open the computer screen from the main body.

* * * * *